US011997161B2

(12) United States Patent
Kodi et al.

(10) Patent No.: US 11,997,161 B2
(45) **Date of Patent: *May 28, 2024**

(54) DISTRIBUTING RISK OF MULTIPLE REALMS ACROSS MULTIPLE RESOURCES BASED ON A REALM RISK MODEL

(71) Applicant: Salesforce, Inc., San Francisco, CA (US)

(72) Inventors: Ahi Kodi, Burlington, MA (US); Arun Sathnur, Boston, MA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/899,284

(22) Filed: Aug. 30, 2022

(65) Prior Publication Data

US 2022/0417320 A1 Dec. 29, 2022

Related U.S. Application Data

(63) Continuation of application No. 17/319,300, filed on May 13, 2021, now Pat. No. 11,457,063.

(51) Int. Cl.

| | |
|---|---|
| ***H04L 67/1001*** | (2022.01) |
| ***G06F 9/50*** | (2006.01) |
| ***H04L 43/0876*** | (2022.01) |

(52) U.S. Cl.

CPC ........ *H04L 67/1001* (2022.05); *G06F 9/5083* (2013.01); *H04L 43/0876* (2013.01)

(58) Field of Classification Search

CPC . G06F 9/5077; G06F 9/5083; H04L 43/0876; H04L 67/1001

See application file for complete search history.

(56) References Cited

U.S. PATENT DOCUMENTS

| | | | | |
|---|---|---|---|---|
| 11,080,109 | B1 | 8/2021 | Poirel | |
| 2019/0036970 | A1 | 1/2019 | Shih | |
| 2020/0159917 | A1 | 5/2020 | Cervantez | |
| 2020/0242632 | A1 | 7/2020 | Pogrebezky | |
| 2020/0287718 | A1 | 9/2020 | Hildebrand | |
| 2021/0182699 | A1 | 6/2021 | Koyyalummal | |
| 2021/0194896 | A1 | 6/2021 | Seymour | |
| 2021/0200840 | A1 | 7/2021 | Kannan | |
| 2022/0027431 | A1 | 1/2022 | Zheng | |
| 2022/0086090 | A1 | 3/2022 | McQuaid | |
| 2023/0229659 | A1 * | 7/2023 | Beresniewicz ....... | G06F 16/217 707/718 |

* cited by examiner

*Primary Examiner* — June Sison

(74) *Attorney, Agent, or Firm* — Butzel Long

(57) ABSTRACT

Methods, computer readable media, and devices for distributing risk of multiple realms across multiple resources based on a realm risk model are disclosed. One method may include determining a time score based on an average response, a traffic score based on an average client request rate, and a risk score based on the time score and the traffic score for a plurality of realms, distributing the plurality of realms across a fixed number of resources based on the risk scores of the plurality of realms, and in response to a change in a risk score of a realm, redistributing the plurality of realms across the fixed number of resources based on a difference between a maximum risk score and a minimum risk score.

15 Claims, 6 Drawing Sheets

| Response Time Range (ms) | Time Score |
|---|---|
| <70 | 0 |
| 70 to 160 | 1 |
| 160 to 240 | 2 |
| 240 to 320 | 3 |
| 320 to 450 | 4 |
| 450 to 600 | 5 |
| 600 to 1000 | 6 |
| 1000 to 3000 | 7 |
| >3000 | 8 |

| Traffic (Requests / s) | Traffic Score |
|---|---|
| < 20 | 0 |
| 20 to 50 | 1 |
| 50 to 100 | 2 |
| 100 to 200 | 3 |
| 200 to 350 | 4 |
| 350 to 500 | 5 |
| 500 to 800 | 6 |
| 800 to 1500 | 7 |
| 1500 to 3000 | 8 |
| 3000 to 5000 | 9 |
| > 5000 | 10 |

| Realm | Client | Avg Traffic | Max Traffic | Response Times | Overall Risk Score |
|---|---|---|---|---|---|
| aagf | Client A | 110 | 470 | 423 | 8 |
| aamz | Client B | 220 | 930 | 76 | 8 |
| bbkq | Client N | 45 | 95 | 800 | 8 |

| Date | Avg Traffic | Max Traffic | Avg Time | Overall Risk Score |
|---|---|---|---|---|
| Sample 1 | 40 rps | 95 rps | 860 ms | 6 |
| 2 Weeks Later | 38 rps | 91 rps | 765 ms | 6 |
| 4 Weeks Later | 37 rps | 127 rps | 255 ms | 3 |

| | 182 | 184 | 186a | 186b | 186c | 186d | 186e | 186f | 186g | 186h |
|---|---|---|---|---|---|---|---|---|---|---|
| | Realm ID | Risk Score | Resource A | Resource B | Resource C | Resource D | Resource E | Resource F | Resource G | Resource H |
| 190a | aagf | 12 | 3 | 3 | 3 | 3 | | | | |
| 190b | aaib | 0 | | | 0 | | | | | 0 |
| 190c | aalr | 5 | 2.5 | 2.5 | | | | | | |
| 190d | aamz | 9 | | | | 3 | 3 | 3 | | |
| 190e | abcm | 1 | 0.5 | | | | | | 0.5 | |
| 190f | bbhg | 2 | | | | | | | 1 | 1 |
| 190g | bbhh | 6 | | | | 3 | 3 | | | |
| 190h | bbhx | 2 | | | 1 | | 1 | | | |
| 190i | bbjj | 2 | | | | | 1 | | | 1 |
| 190j | bbkj | 2 | | | | | 1 | 1 | | |
| 190k | bbkk | 10 | | | | | | 3.3 | 3.3 | 3.3 |
| 190l | bbkl | 8 | | | | 2.7 | 2.7 | | 2.6 | |
| 190m | bbkp | 1 | | | | | 0.5 | 0.5 | | |
| 190n | bbkq | 8 | 2.7 | 2.7 | 2.6 | | | | | |
| 190o | bbkr | 5 | | 2.5 | 2.5 | | | | | |
| 190p | bblg | 5 | | | | | | 2.5 | | 2.5 |
| 190q | bbsk | 3 | | | | | | | 1.5 | 1.5 |
| 190r | bbwg | 1 | 0.5 | | 0.5 | | | | | |
| 190s | bbwn | 2 | | | | | | 1 | | 1 |
| 190t | bbzw | 1 | 0.5 | | 0.5 | | | | | |
| 190u | bfcs | 7 | | 2.3 | | | | | 2.3 | 2.3 |
| 190v | bfct | 1 | | | | | | 0.5 | 0.5 | |
| 190w | bfcq | 4 | 2 | | 2 | | | | | |
| | **Total Risk** | **97** | **11.7** | **13** | **12.1** | **11.7** | **12.2** | **11.8** | **11.7** | **12.6** |

DISTRIBUTING RISK OF MULTIPLE REALMS ACROSS MULTIPLE RESOURCES BASED ON A REALM RISK MODEL

TECHNICAL FIELD

Embodiments disclosed herein relate to techniques and systems for distributing risk of multiple realms across multiple resources based on a realm risk model.

BACKGROUND

From a practical perspective, a user accessing a website may be fairly simplistic. For example, a user may enter a uniform resource location (URL)— an address of the website—into a web browser and select the enter key. In response, the web browser may submit a request for the website, receive a response containing content from the website, and render or otherwise display the content within the web browser.

From a technical perspective, a user accessing a website may be fairly complex. For example, the website may experience such a volume of traffic that a single physical server may not be sufficient. In this example, the website may be hosted or otherwise provided by a number of physical servers and the traffic may be distributed across the physical servers using load balancing. However, while a single physical server may be insufficient to serve traffic for the website, the website may not fully utilize all of the available resources of any one physical server when distributed across a number of servers.

In a traditional approach, a fixed number of resources (e.g., physical servers) and a variable number of realms (e.g., websites, databases, files) may be pooled together into what may commonly be referred to as a pod. Such a pod may include a load balancing mechanism (e.g., load balancer) that distributes traffic for the various realms across the resources. In this traditional approach, any single realm may be distributed across some number of the resources and any single resource may provide services on behalf of multiple realms. However, this traditional approach may not take into account any variability in the performance of and/or requirements of any individual realm. As such, one resource may become overburdened while another resource may be underutilized.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIG. 1B illustrates a sample table of response time ranges for use with distributing risk of multiple realms across multiple resources based on a realm risk model according to some example implementations.

FIG. 1C illustrates a sample table of traffic ranges for use with distributing risk of multiple realms across multiple resources based on a realm risk model according to some example implementations.

FIG. 1D illustrates a sample table of realms, statistics, and risk scores for use with distributing risk of multiple realms across multiple resources based on a realm risk model according to some example implementations.

FIG. 1E illustrates a sample table of statistics and risk scores over time for a realm according to some example implementations.

FIG. 1F illustrates a sample table of realms and resources as well as a distribution of the realms across the resources based on various implementations of the disclosed subject matter.

DETAILED DESCRIPTION

Figure 1A:
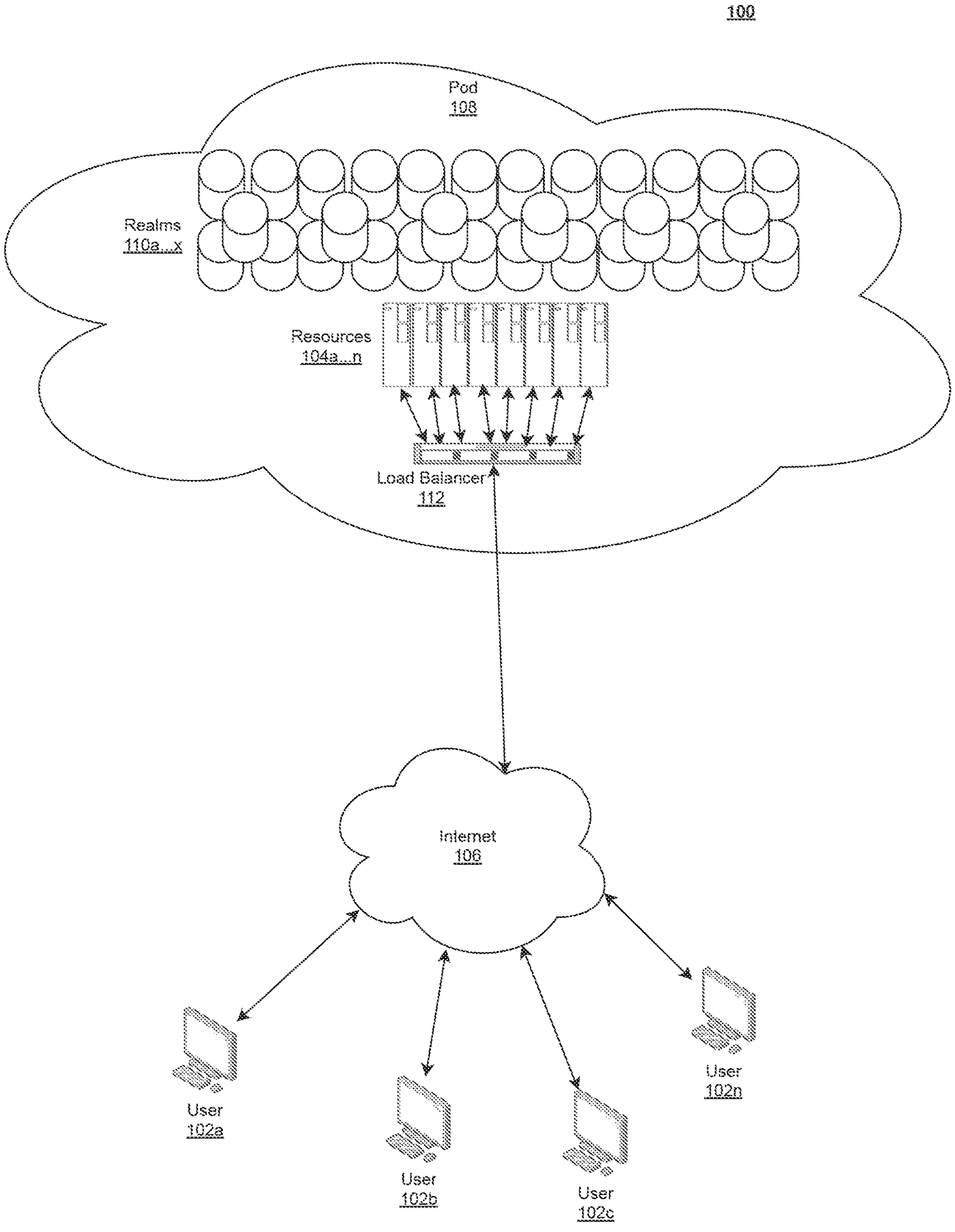
FIG. 1A is a block diagram illustrating a system for use with distributing risk of multiple realms across multiple resources based on a realm risk model according to some example implementations.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Embodiments disclosed herein provide techniques, systems, and devices that allow for distributing risk of multiple realms across multiple resources based on a realm risk model. In particular, disclosed embodiments may enable maximizing utilization of a fixed number of resources while minimizing risk associated with a variable number of realms.

In various implementations, a pod may include a fixed set of resources. For example, the pod may include 10 servers or blades, with each server providing a service such as a web service. This pod may also provide these resources to a variable number of realms. In various implementations, a realm may be, for example, a website, a database, a collection of content, or the like. Generally, a realm may, for example, represent or otherwise belong to a client, a customer, an organization, a group, an individual, or the like. In some implementations, any one realm may, for example, be provided or otherwise supported by at least two resources. That is, traffic directed to a single realm may be load balanced or otherwise distributed across at least two resources. In addition, any one resource may provide service on behalf of one or more realms. That is, a single resource may respond to traffic directed to multiple realms.

However, performance of the pod may be highly variable over time and any assignment of realms and resources may be dynamic. For example, one website (e.g., an informational site) may only draw a small amount of traffic while another website (e.g, a storefront or news site) may generate a significant amount of traffic. Further in this example, while traffic to one site may be fairly consistent over time, traffic to another site may be highly variable. For example, a storefront site may offer a limited time sale or a news site may have a highly sensational story, which temporarily increases traffic to the site. In addition, technical or other changes to a site may impact how the site responds to traffic (e.g., increasing or decreasing response times for individual requests). As such, it may be insufficient to simply assign a random realm to a random resource and any initial assignment may need to be reevaluated over time.

In one example, there may be 3 realms—realm 1, realm 2, and realm 3—to be distributed across resources within a pod. Realm 1 may experience recent traffic of 471 requests/second with a response time of 440 ms, realm 2 may experience recent traffic of 5 requests/second with a response time of 15 ms, and realm 3 may experience recent traffic of 300 requests/second with a response time of 260 ms. Of note, traffic analysis may include information about both volume of traffic and response time. In this example, realms 1 and 3 can be seen as high volume sites while realm 2 can be seen as a low volume site. In order to distribute these sites within the pod, a "risk score" may be developed for each realm that provides an indication of not only how each realm performs, but also how a realm may impact other realms within the pod.

In this example, risk may be defined as an indication of potential and/or likelihood of a realm to degrade in performance based on recent trends in traffic patterns, latest trends in response time, or both. An overall risk score may be defined, for example, as a sum of a traffic risk score and a response time risk score. A response time risk score may be based on, for example, a rolling seven day average of total request times for a realm. In particular, a number of response time ranges may be defined and each range may be assigned an integer value with a shorter response time range having a lower value and a higher response time range having a higher value. A traffic risk score may be based on, for example, a rolling 30 day average of client request rate for a realm. In particular, a number of request per second ranges may be defined and each range may be assigned an integer value with a smaller number of requests range having a smaller value and a larger number of requests range having a larger value. Such response time risk score and traffic risk score are discussed in greater detail below in relation to FIGS. 1B-1C.

As disclosed herein, an overall risk score for a realm may be, for example, a dynamic value that changes over time that is impacted by various factors. For example, weekly traffic trends may change based on seasons and/or a customer's popularity trend. Similarly, code changes, for example, may impact response times (either for better or worse). At the same time, bots may come into play for sustained periods by changing a load profile of a realm. In addition, frequent sale/restock events may result in traffic bursts and, if sustained or frequent, may affect risk levels. Furthermore, moves between pods may also impact response times, particularly if better hardware is associated with the destination pod.

For the 3 realms in this example, realm 1 may have an overall risk score of 8 based on a traffic risk score of 2 and a response time risk score of 6, realm 2 may have an overall risk score of 0 based on a traffic risk score of 0 and a response time risk score of 0, and realm 3 may have an overall risk score of 7 based on a traffic risk score of 5 and response time risk score of 2. Of note, while realms 1 and 3 may have similar overall risk scores, one (i.e., realm 1) is based on a higher response time risk score while the other (i.e., realm 2) is based on a higher traffic risk score. Based on these various scores, a determination may be made to ensure that realms 1 and 3 are distributed across different resources within the pod while realm 2 may be distributed across resources that are shared with either or both of realms 1 and 3.

As can be seen in this one example, an overall risk score may facilitate deployment of a variable number of realms across a fixed number of resources. In particular, by identifying high risk and low risk realms, the various realms may be distributed such that higher risk realms receive sufficient resources while any one higher risk realm may be less likely to impact any other higher risk realm. Such overall risk score may also facilitate improved capacity planning for a pod. For example, an optimal pod score may be determined as a sum of all overall risk scores of realms distributed within the pod. This optimal pod score may be utilized, for example, to determine whether a pod is "full" or otherwise overutilized by comparing the pod score to a threshold. The overall risk score may also be utilized as a performance ranking for individual realms within a pod. By tracking an overall risk score that changes over time, performance of a realm may be evaluated to help identify potential issues and/or concerns.

Implementations of the disclosed subject matter provide methods, computer readable media, and devices for distributing risk of multiple realms across multiple resources based on a realm risk model. In various implementations, a method may include, for one or more realms in a plurality of realms: determining a time score based on an average response time of the respective realm; determining a traffic score based on an average client request rate of the respective realm; and determining a risk score based on the time score and the traffic score of the respective realm, distributing the plurality of realms across a fixed number of resources based on the risk scores of the plurality of realms such that any one realm may be distributed across at least two resources that may be assigned an equal portion of the risk score of the any one realm and a difference between a sum of risk scores assigned to any one resource and a sum of risk scores assigned to any other resource may be within a risk score threshold, and, in response to a change in a risk score of a realm, redistributing the plurality of realms across the fixed number of resources such that a difference between a maximum sum of risk scores assigned to a resource and a minimum sum of risk scores assigned to a different resource may be within the risk score threshold.

In some implementations, determining a time score based on an average response time of the respective realm may include determining the average response time over a rolling seven day period and assigning an integer value as the time score based on the average response time being within one of a plurality of ranges, a range having a shorter average response time indicating a smaller integer value and a range having a longer average response time indicating a larger integer value.

In some implementations, the plurality of ranges may include nine ranges and the integer value may be one of the integer values of zero to eight.

In some implementations, determining a traffic score based on an average client request rate of the respective realm may include determining the average client request rate over a rolling thirty day period and assigning an integer value as the traffic score based on the average client request rate being within one of a plurality of ranges, a range having a lower average client request rate indicating a smaller integer value and a range having a larger average client request rate indicating a larger integer value.

In some implementations, the plurality of ranges may include eleven ranges and the integer value may be one of the integer values of zero to ten.

In some implementations, determining a risk score based on the time score and the traffic score of the respective realm may include combining the time score and the traffic score to determine the risk score.

In various implementations, a realm may include a web site, a resource may include a web service, and distributing any one realm across at least two resources may include configuring the at least two web services of the at least two resources to respond to a corresponding amount of traffic for the web site of the any one realm.

In some implementations, the risk score threshold may be two.

FIG. 1A illustrates a system 100 for use with distributing risk of multiple realms across multiple resources based on a realm risk model according to various implementations of the subject matter disclosed herein. In various implementations, system 100 may include, for example, users 102*a* . . . *n* that access or otherwise connect with realms 110*a* . . . *x* via the Internet 106. Realms 110*a* . . . *x* may be, for example, websites and/or web services provided by or on behalf of various organizations and/or individuals. In some implementations, each realm represents a different organization or individual.

In various implementations, services may be provided, for example, by resources 104*a* . . . *n*. A resource may be, for example, a web server or other computing resource. In one example, resources 104*a* . . . *n* may be computing resources that provide access to content provided by realms 110*a* . . . *x*. In this example, realms 110*a* . . . *x* may be distributed across resources 104*a* . . . *n*. That is, any one resource may provide access to one or more realms and access to any one realm may be provided by two or more resources.

In various implementations, realms 110*a* . . . *x* and resources 104*a* . . . *n* may be referred to as, for example, a pod, such as pod 108. In some implementations, pod 108 may also include, for example, load balancer 112. Load balancer 112 may, for example, be utilized to distribute traffic from users 102*a* . . . *n* to resources 104*a* . . . *n* and realms 110*a* . . . *x*.

Although FIG. 1A shows a single pod, this is only for simplicity. Furthermore, realms 110*a* . . . *x* may include, for example, a variable number of realms and resources 104*a* . . . *n* may include, for example, a fixed number of resources.

FIG. 1B illustrates a table 120 of response time ranges for use with distributing risk of multiple realms across multiple resources based on a realm risk model according to various implementations of the subject matter disclosed herein. In particular, table 120 may include response time range column 122 and time score column 124. While table 120 includes nine response time ranges and nine time scores, this is only for simplicity and more or fewer ranges may be utilized. In various implementations, response time ranges may be determined, for example, based on an analysis of response times for a large number of realms. For example, it may be determined that a very small number of realms experience a response time of 100 ms or less per request. Therefore, a response time of <70 ms may be associated with a time score of 0 and a response time between 70 to 160 ms may be associated with a time score of 1. In this same example, it may be determined that an average performing realm experiences a response time of approximately 250 ms. As such, other ranges may be 160 to 240 ms, 240 to 320 ms, and 320 to 450 ms. With each progressively slower range, an associated time score may increase. In this way, a slower realm may be represented as having a higher risk.

FIG. 1C illustrates a table 130 of traffic ranges for use with distributing risk of multiple realms across multiple resources based on a realm risk model according to various implementations of the subject matter disclosed herein. In particular, table 130 may include traffic column 132 and traffic score column 134. While table 130 includes 11 traffic ranges and 11 traffic scores, this is only for simplicity and more or fewer ranges may be utilized. In various, implementations, traffic may represent a number of requests received per second and the various traffic ranges may be determined, for example, based on an analysis of traffic for a large number of realms. For example, it may be determined that a very well performing realm may receive upwards of 500 requests per second while a poor performing realm may have little traffic. Furthermore, an extremely active realm may experience more than 5,000 requests per second. As such, a traffic range of <20 may have an associated traffic score of 0, a traffic range of 350 to 500 may have an associated traffic score of 5, and a traffic range >5,000 may have an associated traffic score of 10. Other ranges may be added in between with smaller traffic volume having a smaller associated traffic score and larger traffic volume having a larger associated traffic score.

FIG. 1D illustrates a table 140 of realms, statistics, and risk scores according to various implementations of the disclosed subject matter. In particular, table 140 may include columns for realm 146, client 148, avg traffic 150, max traffic 152, response time 154, and overall risk score 156. For simplicity, table 140 may include 3 realms 142*a* . . . *n*. As can be seen, various realms may experience different amounts of traffic and have differing response times, yet the various realms may have the same or similar overall risk scores associated with each realm.

FIG. 1E illustrates a table 160 of statistics and risk scores over time for a realm according to various implementations of the disclosed subject matter. In particular, table 160 may include columns for date 168, avg traffic 170, max traffic 172, avg time 174, and overall risk score 176. For simplicity, table 160 may include 3 dates 162*a* . . . *n*. In particular, date 162*a* may represent an initial sample date, date 162*b* may represent a sample date 2 weeks later, and date 162*n* may represent a sample date 4 weeks later. As can be seen, the various statistics, and associated risk scores, may change over time.

In various implementations, a traffic score may be based, for example, on a rolling 30 day period. Traffic patterns for a realm may be influenced by a number of factors including brand popularity, time of year, competition, product lines, and the like. Traffic patterns may also be influenced by unprecedented events such as a pandemic. For example, a retailer may file for bankruptcy or an online food order provider may experience significantly larger orders. As such, utilizing a maximum traffic value over the last 30 days provides insight into current and most recent traffic trends that may include day/night patterns, weekends, seasonal sales, and the like. Such maximum traffic value may be an aggregate value that may be a better representation than a peak that was seen for just a couple of minutes.

In various implementations, a response time score may be based, for example, on a rolling 7 day period. Response times may be prone, for example, to quick changes. The changes may be due, for example, to code deployments that may add inefficiencies and/or any change to content or infrastructure that ends up with a request using more processing time. For example, an implementation of a better caching strategy may reduce response times. In another example, a burst of bot traffic may skew average response times overnight. As such, utilizing an average response time over the last 7 days provides insight into current and most recent performance of a realm.

FIG. 1F illustrates a table 180 of realms and resources as well as a distribution of the realms across the resources based on various implementations of the disclosed subject matter. Table 180 includes columns for realm ID 182, risk score 184, and resources A . . . H 186*a* . . . *h*. The various rows table 180 include a row for each realm 190*a* . . . *w* as well as a total risk row which includes a summation of all risk scores and a summation of risk scores for each resource. As can be seen, the various realms have risk scores that range from 0 (low risk) to 12 (high risk). For example, realm 190*a* has a risk score of 12, realm 190*d* has a risk score of 9, and realm 190*k* has a risk score of 10 while realm 190*b* has a risk score of 0 and realms 190*e*, 190*m*, 190*r*, 190*t*, and 190*v* have risk scores of 1.

In various implementations, any one realm may require distribution across at least two resources. For example, even though realm 190*b* currently has a risk score of 0, that realm may be distributed across resource C 186*c* and resource H 186*h*. In some implementations, the number of resources over which a realm may be distributed may be based on a range of risk scores. For example, a realm with a risk score below 6 may be distributed across two resources, a realm with a risk score between 7 and 11 may be distributed across three resources, a realm with a risk score between 12 and 16 may be distributed across four resources, and a realm with a risk score above 16 may be distributed across five or six resources.

In various implementations, the difference between the minimum total risk score associated with one resource and the maximum total risk score associated with another resource may be within a risk score threshold. For example, as can be seen in table 180, the minimum total risk score is 11.7 (associated with resource A 186*a*, resource D 186*d*, and resource G 186*g*), the maximum total risk score is 13 (associated with resource B 186*b*), and the difference between 13 and 11.7 is within a risk score threshold of 2.

In order to achieve the defined requirements (i.e., any one realm distributed across at least two resources and difference between minimum and maximum risk scores within a risk score threshold), some realms may actually be distributed across more than two resources. For example, realm 190*a* may be distributed across four resources—resource A 186*a*, resource B 186*b*, resource C 186*c*, resource D 186*d* and realm 190*d* may be distributed across 3 resources—resource D 186*d*, resource E 186*e*, and resource F 186*f*. Any distribution of a realm need not be across contiguous resources. For example, realm 190*t* may be distributed across resource A 186*a* and resource C 186*c*. Even though one resource may provide services to multiple high risk score realms (e.g., resource D 186*d*), no single realm may be provided services by a single resource. As such, even if a single resource were to experience issues (e.g., hardware failure, reduced performance), no realm would become non-functioning.

While table 180 provides a snapshot of the various realms and resources at a single point in time, this is only for simplicity. It can be seen that, as risk scores change over time, realms may be re-distributed across the various resources while maintaining any defined requirements. In particular, as risk scores change, realms may be re-distributed across resources such that the difference between a minimum risk score and a maximum risk score remains within a risk score threshold. In this way, a fixed number of resources may ensure a level of performance for a variable number of realms.

Figure 2:
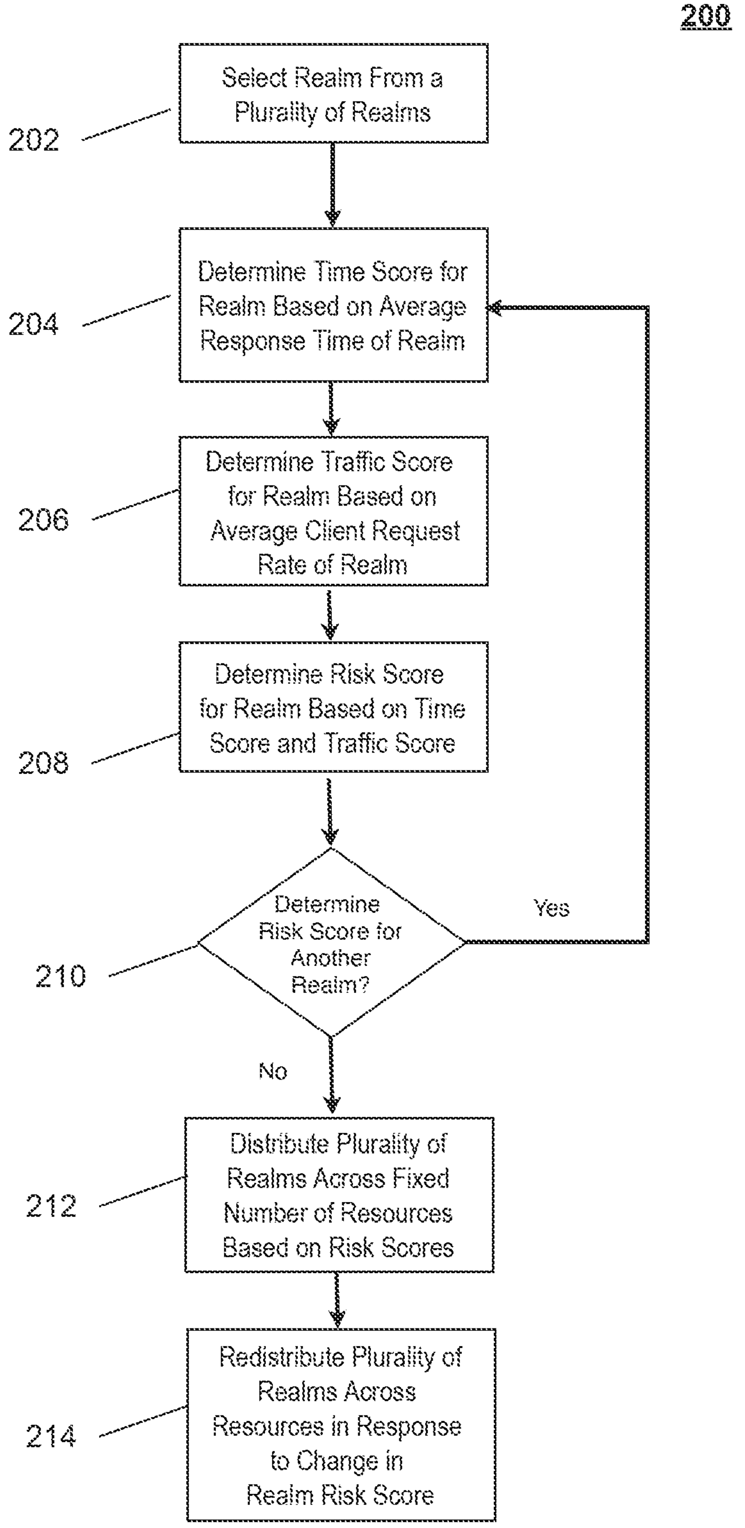
FIG. 2 is a flow diagram illustrating a method for use with distributing risk of multiple realms across multiple resources based on a realm risk model according to some example implementations.

FIG. 2 illustrates a method 200 for distributing risk of multiple realms across multiple resources based on a realm risk model, as disclosed herein. In various implementations, the steps of method 200 may be performed by a server, such as electronic device 300 of FIG. 3A or system 340 of FIG. 3B, and/or by software executing on a server or distributed computing platform. Although the steps of method 200 are presented in a particular order, this is only for simplicity.

In step 202, a realm may be selected from a plurality of realms. In various implementations, the plurality of realms may be, for example, a variable number of realms. For example, the plurality of realms may include thirty realms or some smaller or larger number of realms. Each realm may represent, for example, a website or other collection of information to be accessed by one or more users.

In step 204, a time score may be determined for the selected realm based on an average response time of the realm. In various implementations, the average response time may be an average of response times over a rolling 7 day period. A response time may be, for example, an amount of time, typically measured in milliseconds, needed to provide a response to a request for content from a realm by a resource. In some implementations, a number of response time ranges may be defined and a time risk score may be associated with each range. For example, nine response time ranges may be defined and a time risk score varying from 0 to 8 may be associated with each range (e.g., time risk score 0 with the lowest response time range and time risk score 8 with the highest response time range). Such example is reflected by table 120 of FIG. 1B, as discussed above.

In step 206, a traffic score may be determined for the selected range based on an average of traffic requests per second received by the realm. In various implementations, the average of traffic requests per second may be an average of requests per second over a rolling 30 day period. In some implementations, a number of requests per second ranges may be defined and a traffic risk score may be associated with each range. For example, eleven traffic ranges may be defined and a traffic risk score varying from 0 to 10 may be associated with each range (e.g., traffic risk score of 0 with the lowest traffic range and traffic risk score of 10 with highest traffic range). Such example is reflected by table 130 of FIG. 1C, as discussed above.

In step 208, a risk score may be determined for the selected realm based on the time score and the traffic score. In various implementations, the risk score may be determined by adding the time score and the traffic score together. For example, if the selected realm has a time score of 2 and a traffic score of 4, the risk score may be 6.

In determination step 210, a determination may be made as to whether a risk score needs to be determined for another realm. If a risk score for another realm needs to be determined (i.e., determination step 210="Yes"), then the method may return to step 204. If a risk score for another realm does not need to be determined (i.e., determination step 210="No"), then the method may proceed to step 212.

In step 212, the plurality of realms may be distributed across a fixed number of resources based on the determined risk scores. In various implementations, each resource may be a web service or other computing resource. For example, the resources may be web services configured to respond to requests for content from the plurality of realms. In some implementations, the plurality of realms may be distributed across the resources based on defined requirements. For example, one requirement may be that any one realm is provided at least two resources. As another example, one requirement may be that the difference between a minimum total risk score associated with one resource (i.e., the smallest sum of risk scores associated with any realms assigned to a resource) and a maximum total risk score associated with another resource (i.e., the largest sum of risk scores associated with any realms assigned to a resource) is within a risk score threshold (e.g., a value of 2).

In step 214, the plurality of realms may be redistributed across the resources in response to a change in a realm risk score. For example, if a risk score associated with one realm where to increase (e.g., the realm experiences increased traffic and/or an increase in response times), then the overall sum of risk scores associated with realms assigned to the same resource may also increase and an increased risk of issues or performance degradation may be experienced. In order to mitigate such increased risk, the realm with the increased score may be moved to a different resource or may be redistributed across a larger number of resources (e.g., assigned 4 resources instead of 3). In another example, if a risk score associated with one realm where to decrease (e.g., the realm experiences reduced traffic and/or a reduction in response times), then the overall sum of risk scores associated with realms assigned to the same resource may also decrease and a decreased risk of issues or performance degradation may be experienced. In order to take advantage of such reduced risk, one or more other realms may be moved to or otherwise redistributed in such a manner as to allocate additional risk to the resource and away from other resources.

As disclosed herein, distributing risk of multiple realms across multiple resources based on a realm risk model may enable the resources to provide improved performance to a larger number of realms and/or realms experiencing a higher risk of performance degradation.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term “user” refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 3A:
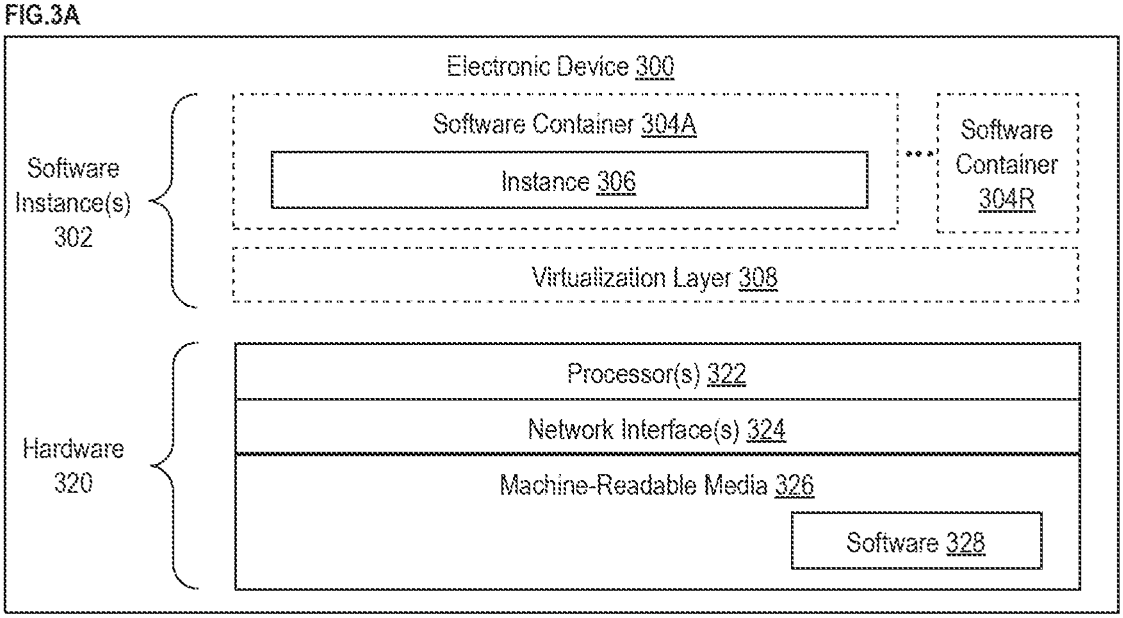
FIG. 3A is a block diagram illustrating an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and consolidated order manager may be implemented in one or more electronic devices 300.

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the “bare metal” electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

Figure 3B:
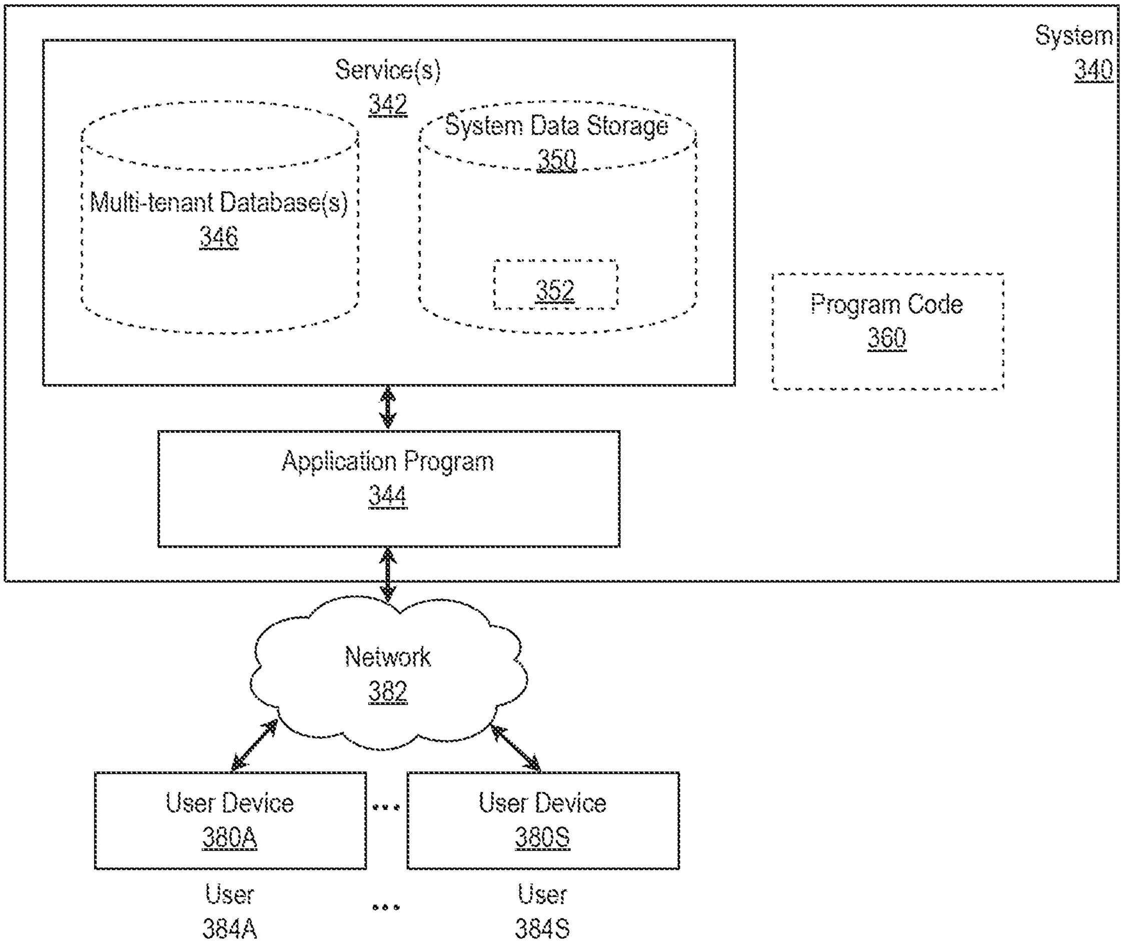
FIG. 3B is a block diagram of a deployment environment according to some example implementations.

FIG. 3B is a block diagram of a deployment environment according to some example implementations. A system 340 includes hardware (e.g., a set of one or more server devices) and software to provide service(s) 342, including a consolidated order manager. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services.

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following types of services: Customer relationship management (CRM); Configure, price, quote (CPQ); Business process modeling (BPM); Customer support; Marketing; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 340 may include an application platform 344 that enables PAAS for creating, managing, and executing one or more applications developed by the provider of the application platform 344, users accessing the system 340 via one or more of user devices 380A-380S, or third-party application developers accessing the system 340 via one or more of user devices 380A-380S.

In some implementations, one or more of the service(s) 342 may use one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user devices 380A-380S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the multi-tenant database(s) 346 and/or system data storage 350.

In some implementations, the service(s) 342 are implemented using virtual applications dynamically created at run time responsive to queries from the user devices 380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the framework for modeling heterogeneous feature sets, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4$^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages and applications available to it from system 340 over network 382.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer-implemented method comprising:

distributing a plurality of realms across a fixed number of resources based on the risk scores of the plurality of realms such that:

any one realm is distributed across at least two resources that are assigned an equal portion of the risk score of the any one realm; and a difference between a sum of risk scores assigned to any one resource and a sum of risk scores assigned to any other resource is within a risk score threshold; and in response to a change in a risk score of a realm, redistributing the plurality of realms across the fixed number of resources such that a difference between a maximum sum of risk scores assigned to a resource and a minimum sum of risk scores assigned to a different resource is within the risk score threshold;

wherein a risk score of a realm is based on one or more selected from a group consisting of: an average response time of the realm and an average request rate of the realm.

2. The computer-implemented method of claim 1, wherein the average response time is calculated as an integer value based on an average response time calculated over a rolling time period assigned to one of a plurality of ranges, a range having a shorter average response time indicating a smaller integer value and a range having a longer average response time indicating a larger integer value.

3. The computer-implemented method of claim 1, wherein the average request rate is determined over a rolling multi-day period and assigned an integer value based on the average client request over the multi-day period being within one of a plurality of ranges, a range having a lower average client request rate indicating a smaller integer value and a range having a larger average client request rate indicating a larger integer value.

4. The computer-implemented method of claim 1, wherein a risk score of a realm is based on the average response time and the average request rate of the realm.

5. The computer-implemented method of claim 1, wherein:

a realm comprises a web site;

a resource comprises a web service; and distributing any one realm across at least two resources comprises configuring the at least two web services of the at least two resources to respond to a corresponding amount of traffic for the web site of the any one realm.

6. A non-transitory machine-readable storage medium that provides instructions that, if executed by a processor, are configurable to cause the processor to perform operations comprising:

distributing a plurality of realms across a fixed number of resources based on the risk scores of the plurality of realms such that:

any one realm is distributed across at least two resources that are assigned an equal portion of the risk score of the any one realm; and a difference between a sum of risk scores assigned to any one resource and a sum of risk scores assigned to any other resource is within a risk score threshold; and in response to a change in a risk score of a realm, redistributing the plurality of realms across the fixed number of resources such that a difference between a maximum sum of risk scores assigned to a resource and a minimum sum of risk scores assigned to a different resource is within the risk score threshold;

wherein a risk score of a realm is based on one or more selected from a group consisting of: an average response time of the realm and an average request rate of the realm.

7. The non-transitory machine-readable storage medium of claim 6, wherein the average response time is calculated as an integer value based on an average response time calculated over a rolling time period assigned to one of a plurality of ranges, a range having a shorter average response time indicating a smaller integer value and a range having a longer average response time indicating a larger integer value.

8. The non-transitory machine-readable storage medium of claim 6, wherein the average request rate is determined over a rolling multi-day period and assigned an integer value based on the average client request over the multi-day period being within one of a plurality of ranges, a range having a lower average client request rate indicating a smaller integer value and a range having a larger average client request rate indicating a larger integer value.

9. The non-transitory machine-readable storage medium of claim 6, wherein a risk score of a realm is based on the average response time and the average request rate of the realm.

10. The non-transitory machine-readable storage medium of claim 6, wherein:

a realm comprises a web site;

a resource comprises a web service; and distributing any one realm across at least two resources comprises configuring the at least two web services of the at least two resources to respond to a corresponding amount of traffic for the web site of the any one realm.

11. An apparatus comprising:

a processor; and a non-transitory machine-readable storage medium that provides instructions that, if executed by a processor, are configurable to cause the processor to perform operations comprising:

distributing a plurality of realms across a fixed number of resources based on the risk scores of the plurality of realms such that:

any one realm is distributed across at least two resources that are assigned an equal portion of the risk score of the any one realm; and a difference between a sum of risk scores assigned to any one resource and a sum of risk scores assigned to any other resource is within a risk score threshold; and in response to a change in a risk score of a realm, redistributing the plurality of realms across the fixed number of resources such that a difference between a maximum sum of risk scores assigned to a resource and a minimum sum of risk scores assigned to a different resource is within the risk score threshold;

wherein a risk score of a realm is based on one or more selected from a group consisting of: an average response time of the realm and an average request rate of the realm.

12. The apparatus of claim 11, wherein the average response time is calculated as an integer value based on an average response time calculated over a rolling time period assigned to one of a plurality of ranges, a range having a shorter average response time indicating a smaller integer value and a range having a longer average response time indicating a larger integer value.

13. The apparatus of claim 11, wherein the average request rate is determined over a rolling multi-day period and assigned an integer value based on the average client request over the multi-day period being within one of a plurality of ranges, a range having a lower average client request rate indicating a smaller integer value and a range having a larger average client request rate indicating a larger integer value.

14. The apparatus of claim 11, wherein a risk score of a realm is based on the average response time and the average request rate of the realm.

15. The apparatus of claim 11, wherein:

a realm comprises a web site;

a resource comprises a web service; and distributing any one realm across at least two resources comprises configuring the at least two web services of the at least two resources to respond to a corresponding amount of traffic for the web site of the any one realm.

* * * * *